(12) United States Patent
Togawa

(10) Patent No.: US 12,462,288 B2
(45) Date of Patent: Nov. 4, 2025

(54) PRODUCT RECOMMENDATION SYSTEM, PRODUCT RECOMMENDATION METHOD, AND RECORDINGMEDIUM STORING PRODUCT RECOMMENDATION PROGRAM

(71) Applicant: NEC Corporation, Tokyo (JP)

(72) Inventor: Ryosuke Togawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 523 days.

(21) Appl. No.: 17/910,096

(22) PCT Filed: Mar. 27, 2020

(86) PCT No.: PCT/JP2020/014052
§ 371 (c)(1),
(2) Date: Apr. 4, 2023

(87) PCT Pub. No.: WO2021/192232
PCT Pub. Date: Sep. 30, 2021

(65) Prior Publication Data
US 2023/0230143 A1    Jul. 20, 2023

(51) Int. Cl.
*G06Q 30/00* (2023.01)
*G06Q 30/0601* (2023.01)

(52) U.S. Cl.
CPC ................ *G06Q 30/0631* (2013.01)

(58) Field of Classification Search
CPC ............................... G06Q 30/06–08
See application file for complete search history.

(56) References Cited

U.S. PATENT DOCUMENTS 8,380,583 B1 * 2/2013 Chanda ............ G06Q 30/0255
705/26.7
2006/0173872 A1    8/2006 Koike et al.
(Continued)

FOREIGN PATENT DOCUMENTS

JP    2002-298227 A    10/2002
JP    2006-190127 A     7/2006
(Continued)

OTHER PUBLICATIONS

Khan, Aman et al., "Trend Detection Using Time Based Sequential Recommendations", 2019 5th International Conference on Computing, Communication, Control and Automation (ICCUBEA), Proceedings: 6. IEEE, 2019 (Year: 2019).*
(Continued)

*Primary Examiner* — Ethan D Civan
(74) *Attorney, Agent, or Firm* — Sughrue Mion, PLLC

(57) ABSTRACT

A product recommendation system is provided with: an estimation model, which expresses a relationship between purchase behavior information pertaining to a subject customer during a first period (expressing a time-series change in product purchase activity on the part of the subject customer) and subject customer attribute information (expressing a time-series change in an attribute of the subject customer), and a product purchase record for the subject customer after the first period; and an estimation unit which, on the basis of purchase behavior information and subject customer attribute information during a second period after the first period, estimates a recommended product for the subject customer after the second period.

16 Claims, 12 Drawing Sheets

(56) References Cited

U.S. PATENT DOCUMENTS

| | | |
|---|---|---|
| 2015/0332369 A1 | 11/2015 | Nakane |
| 2016/0210681 A1 | 7/2016 | Motohashi et al. |
| 2019/0340670 A1 | 11/2019 | Tomobe et al. |
| 2020/0126035 A1* | 4/2020 | Zeng .................. G06Q 30/0251 |
| 2020/0192915 A1 | 6/2020 | Oyamada et al. |
| 2020/0349438 A1 | 11/2020 | Takamatsu et al. |
| 2021/0042770 A1 | 2/2021 | Miyata et al. |

FOREIGN PATENT DOCUMENTS

| | | |
|---|---|---|
| JP | 2015-219784 A | 12/2015 |
| JP | 2016-212792 A | 12/2016 |
| JP | 2018-190409 A | 11/2018 |
| WO | 03/017137 A1 | 2/2003 |
| WO | 2015/040789 A1 | 3/2015 |
| WO | 2018/078761 A1 | 5/2018 |
| WO | 2018/088276 A1 | 5/2018 |
| WO | 2019/142597 A1 | 7/2019 |
| WO | 2019/208319 A1 | 10/2019 |

OTHER PUBLICATIONS

International Search Report for PCT Application No. PCT/JP2020/014052, mailed on Sep. 8, 2020.
English translation of Written opinion for PCT Application No. PCT/JP2020/014052, mailed on Sep. 8, 2020.
Lu Wang et al., "Learning Robust Representations with Graph Denoising Policy Network", arXiv:1910.01784, Oct. 4, 2019, pp. 1-10.
Dongkuan Xu et al., "Spatio-Temporal Attentive RNN for Node Classification in Temporal Attributed Graphs", Proceedings of the Twenty-Eighth International Joint Conference on Artificial Intelligence (IJCAI-19). Aug. 11-12, 2019. pp. 3947-3953.
Wenchao Yu et al., "NetWalk: A Flexible Deep Embedding Approach for Anomaly Detection in Dynamic Networks", KDD 2018, Aug. 19-23, 2018, London, United Kingdom, pp. 2672-2681.

* cited by examiner

Fig. 2

100 PURCHASE BEHAVIOR INFORMATION / 101 PURCHASE RECORD INFORMATION

| SUBJECT CUSTOMER | PURCHASE DATE | PURCHASED PRODUCT | UNIT PRICE | QUANTITY | PURCHASE AMOUNT |
|---|---|---|---|---|---|
| CUSTOMER A | 2019/2/18 | PRODUCT X | 100,000 YEN | 30 | 3,000,000 YEN |
|  | 2019/4/6 | PRODUCT Y | 200,000 YEN | 20 | 4,000,000 YEN |
|  | ... | ... | ... | ... | ... |
| CUSTOMER B | 2019/3/10 | PRODUCT Y | 200,000 YEN | 25 | 5,000,000 YEN |
|  | 2019/6/22 | PRODUCT Z | 300,000 YEN | 10 | 3,000,000 YEN |
|  | ... | ... | ... | ... | ... |
| CUSTOMER C | 2019/1/27 | PRODUCT Z | 300,000 YEN | 5 | 1,500,000 YEN |
|  | 2019/5/19 | PRODUCT X | 100,000 YEN | 20 | 2,000,000 YEN |
|  | ... | ... | ... | ... | ... |
| ... | | | | | |

Fig. 3

100 PURCHASE BEHAVIOR INFORMATION

102 PRODUCT ATTRIBUTE INFORMATION

| PRODUCT | UNIT PRICE | KIND OF PRODUCT |
|---|---|---|
| PRODUCT X | 100,000 YEN | PERSONAL COMPUTER |
| PRODUCT Y | 200,000 YEN | SERVER DEVICE |
| PRODUCT Z | 300,000 YEN | SYSTEM MANAGEMENT SOFTWARE |
| . . . | . . . | . . . |

Fig. 5

104 SUBJECT CUSTOMER ATTRIBUTE INFORMATION

| SUBJECT CUSTOMER | CAPITAL | BUSINESS FIELD | SALES | NET PROFIT |
|---|---|---|---|---|
| CUSTOMER A | 1,000,000,000 YEN | RETAIL | 5,000,000,000 YEN | 500,000,000 YEN |
| CUSTOMER B | 400,000,000 YEN | SERVICE | 4,000,000,000 YEN | 1,000,000,000 YEN |
| CUSTOMER C | 700,000,000 YEN | MANUFACTURE | 7,000,000,000 YEN | 1,500,000,000 YEN |
| ... | ... | ... | ... | ... |

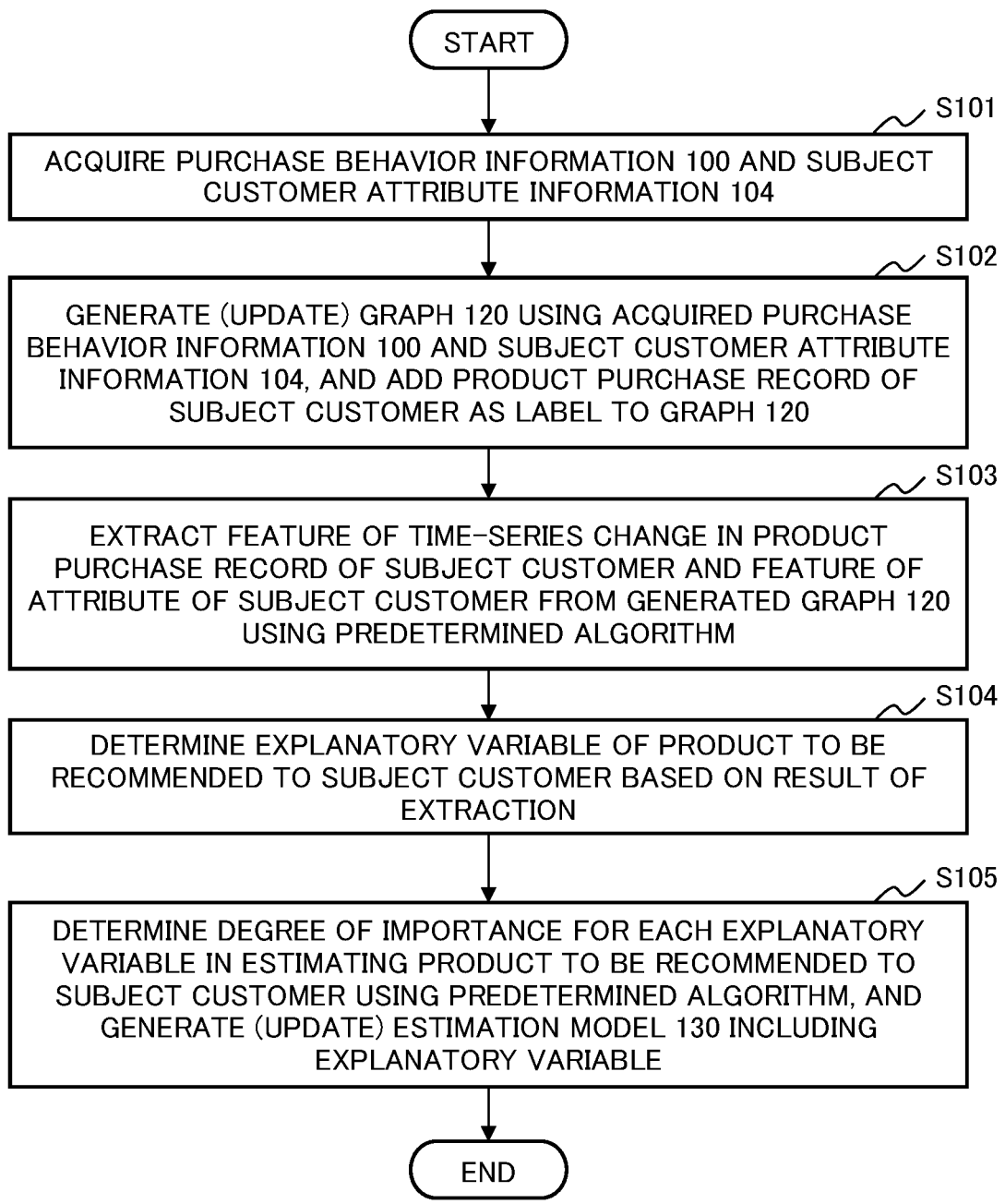

Fig. 8

200 DISPLAY SCREEN

RECOMMENDED PRODUCT FOR CUSTOMER A

PRODUCT X
<REASON FOR RECOMMENDATION>
1. CUSTOMER C OF ANOTHER COMPANY IN SAME BUSINESS FIELD HAS RECORD OF PURCHASING PRODUCT X.
2. CUSTOMER A HAS RECENTLY PURCHASED PRODUCT Y. CUSTOMER F OF ANOTHER COMPANY IN SAME BUSINESS FIELD HAS PURCHASED PRODUCT X AFTER PURCHASING PRODUCT Y.
3. CUSTOMER A WITH CAPITAL OF 1,000,000,000 YEN HAS BUSINESS PERFORMANCE THAT HAS CONTINUOUSLY IMPROVED FOR 6 MONTHS, AND CUSTOMER WITH CAPITAL IN AMOUNT OF 1,000,000,000 YEN OR MORE TENDS TO PURCHASE PRODUCT X AT TIMING WHEN BUSINESS PERFORMANCE HAS CONTINUOUSLY IMPROVED FOR 6 MONTHS OR MORE.

PRODUCT Z
<REASON FOR RECOMMENDATION>
...

Fig. 9

200 DISPLAY SCREEN

RECOMMENDED PRODUCT FOR CUSTOMER D

SKIN LOTION W
<REASON FOR RECOMMENDATION>
DETAILS OF EVALUATION OF SKIN LOTION V THAT IS HIGHLY EVALUATED BY CUSTOMER D ARE SIMILAR TO DETAILS OF EVALUATION OF SKIN LOTION W THAT IS EVALUATED BY CUSTOMER E.

DETAILS OF EVALUATION OF SKIN LOTION V EVALUATED BY CUSTOMER D IN PAST
• FACE PACK V1  ★5: IT HAS BEST MOISTURIZING POWER, BRIGHT AND CLEAR FEELING, AND SKIN TEXTURE.
• CREAM V2  ★4: IT HAS HIGH MOISTURIZING POWER AND GOOD COST EFFECTIVENESS.

DETAILS OF EVALUATION OF SKIN LOTION W EVALUATED BY CUSTOMER E IN PAST
• IT IS LESS IRRITATING, AND MOISTURIZES WELL WITH HIGH MOISTURIZING POWER.
• IT IS MOST MOISTURIZING AMONG SKIN LOTIONS THAT HAVE BEEN USED UP TO NOW.

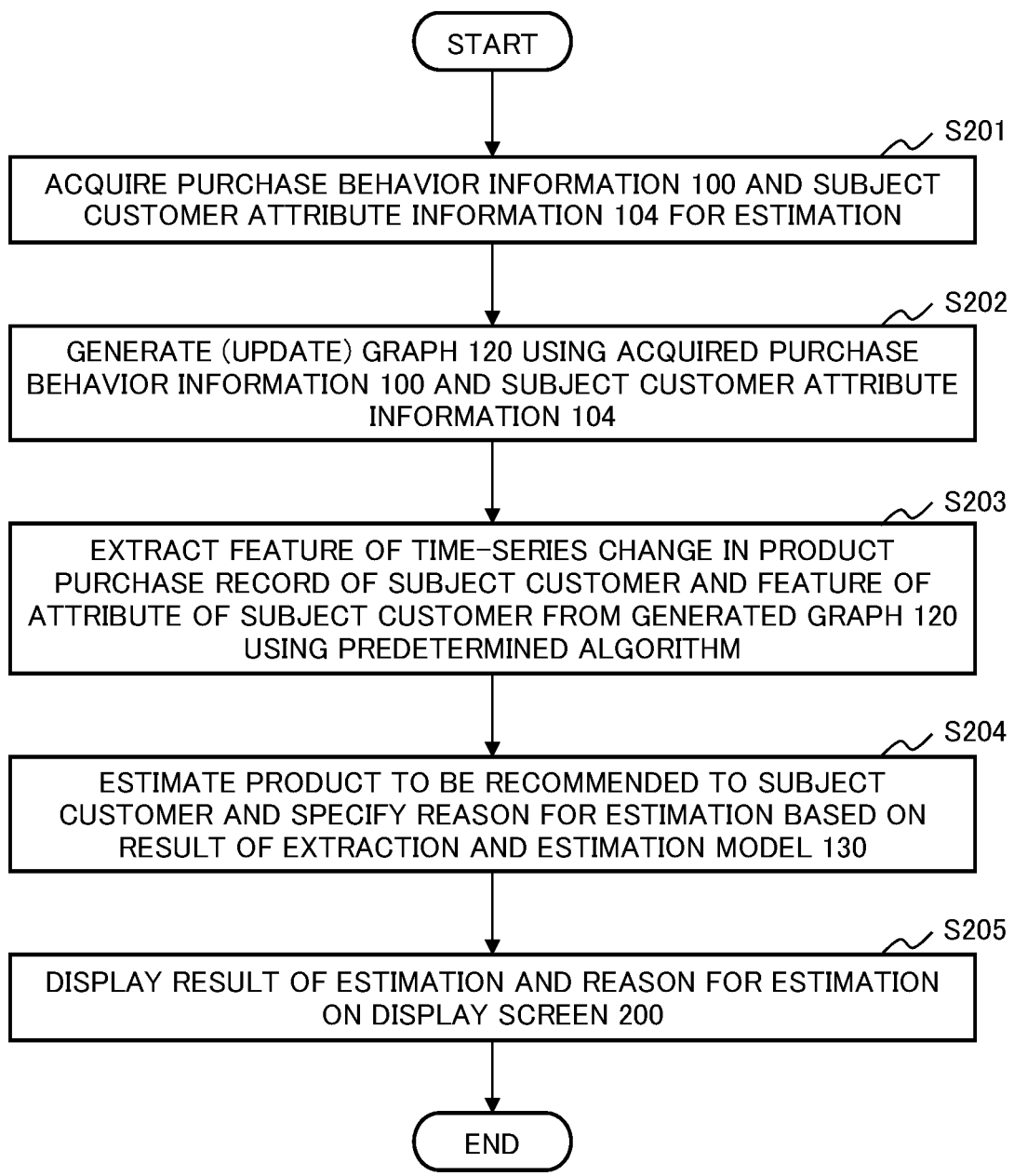

PRODUCT RECOMMENDATION SYSTEM, PRODUCT RECOMMENDATION METHOD, AND RECORDINGMEDIUM STORING PRODUCT RECOMMENDATION PROGRAM

This application is a National Stage Entry of PCT/JP2020/014052 filed on Mar. 27, 2020, the contents of all of which are incorporated herein by reference, in their entirety.

TECHNICAL FIELD

The present disclosure relates to a product recommendation system, a product recommendation device, a product recommendation method, and a recording medium storing a product recommendation program.

BACKGROUND ART

For a business operator who sells products to customers, it is very important to grasp what product needs to be recommended to a customer from the needs of the customer. Therefore, concerning a system for estimating a product to be recommended to a customer, there is a demand for a technique for improving estimation precision.

As a technique related to such a technique, PTL 1 discloses a system that supports sales of music players to customers of music distribution service. On the basis of customer information of each customer, this system generates a data sample constituted by a combination of a feature amount vector based on attribute information of the customer and information indicating whether a music player has been purchased. Then, this system generates a parameter of a prediction model (estimation model) using a set of generated data samples as learning data.

In addition, PTL 2 discloses a system that predicts a relationship between a designated customer and a product using a prediction model. This system predicts whether the customer is unlikely to purchase the product, or the customer has not purchased the product at the current time but the customer is highly likely to purchase the product in the future.

CITATION LIST

Patent Literature

[PTL 1] WO 2019/142597 A
[PTL 2] WO 2018/088276 A

Non Patent Literature

[NPL 1] Lu Wang, Wenchao Yu, Wei Wang, Wei Cheng, Wei Zhang, Hongyuan Zha, Xiaofeng He, Haifeng Chen, "Learning Robust Representations with Graph Denoising Policy Network", arXiv:1910.01784, Oct. 4, 2019
[NPL 2] Dongkuan Xu, Wei Cheng, Dongsheng Luo, Xiao Liu, Xiang Zhang, "Spatio-Temporal Attentive RNN for Node Classification in Temporal Attributed Graphs", Twenty-Eighth International Joint Conference on Artificial Intelligence Main track, Pages 3947-3953, Aug. 11-12, 2019
[NPL 3] Wenchao Yu, Wei Cheng, Charu Aggarwal, Kai Zhang, Haifeng Chen, Wei Wang, "NetWalk: A Flexible Deep Embedding Approach for Anomaly Detection in Dynamic Networks", KDD 2018, Aug. 19-23, 2018, London, United Kingdom

SUMMARY OF INVENTION

Technical Problem

In order to estimate a product to be recommended to a customer with high precision, it is necessary to estimate a product in consideration of various purchase factors that affect each other in a complicated manner. For example, the purchase factors include a feature of a time-series change (course or temporal change) in product purchase record of a customer, a feature of a time-series change in attribute of the customer, and a feature of a time-series change in attribute of a product. Therefore, in order to estimate a product to be recommended to a customer with high precision, it is necessary to perform analysis after grasping a feature of a time-series change in the customer's purchase activity with high precision.

However, a typical system for estimating a product to be recommended to a customer is not capable of sufficiently grasping a feature of a time-series change in the customer's purchase activity. Therefore, in particular, in a case where the feature of the time-series change is an important factor in the customer's product purchase, the typical system has considerably low precision in estimating a product to be recommended. It cannot be said that the techniques disclosed in PTL 1 and PTL 2, which are described above, are sufficient to solve this problem.

A main object of the present disclosure is to provide a product recommendation system and the like capable of improving precision with which a product to be recommended to a customer is estimated.

Solution to Problem

According to an aspect of the present disclosure, a product recommendation system includes an estimation means configured to estimate a product to be recommended to a subject customer after a second period that is later than a first period, based on an estimation model and purchase behavior information and subject customer attribute information during the second period, the estimation model expressing a relationship between the purchase behavior information and the subject customer attribute information pertaining to the subject customer during the first period and a product purchase record of the subject customer after the first period, in which the purchase behavior information indicates a time-series change in product purchase activity of the subject customer, and the subject customer attribute information includes information indicating a time-series change in attribute of the subject customer.

According to another aspect of the present disclosure, a product recommendation method performed by an information processing system includes estimating a product to be recommended to a subject customer after a second period that is later than a first period, based on an estimation model and purchase behavior information and subject customer attribute information during the second period, the estimation model expressing a relationship between purchase behavior information and subject customer attribute information pertaining to the subject customer during the first period and a product purchase record of the subject customer after the first period, in which the purchase behavior information indicates a time-series change in product purchase activity of the subject customer, and the subject customer attribute information includes information indicating a time-series change in attribute of the subject customer.

According to another aspect of the present disclosure, a product recommendation program causes a computer to execute processing including estimating a product to be recommended to a subject customer after a second period that is later than a first period, based on an estimation model and purchase behavior information and subject customer attribute information during the second period, the estimation model expressing a relationship between the purchase behavior information and the subject customer attribute information pertaining to the subject customer during the first period and a product purchase record of the subject customer after the first period, wherein the purchase behavior information indicates a time-series change in product purchase activity of the subject customer, and the subject customer attribute information includes information indicating a time-series change in attribute of the subject customer.

Furthermore, the present disclosure can also be implemented by a non-volatile computer-readable recording medium storing the product recommendation program (computer program).

Advantageous Effects of Invention

According to the present disclosure, it is possible to obtain a developed estimation system and the like capable of improving precision with which a product to be recommended to a customer is estimated.

BRIEF DESCRIPTION OF DRAWINGS

FIG. 2 is a diagram illustrating details of purchase record information 101 according to the first example embodiment of the present disclosure.

FIG. 3 is a diagram illustrating details of product attribute information 102 according to the first example embodiment of the present disclosure.

FIG. 5 is a diagram illustrating details of subject customer attribute information 104 according to the first example embodiment of the present disclosure.

FIG. 7 is a flowchart illustrating an operation (process) of generating an estimation model 130 (performing machine learning) by the product recommendation system 10 according to the first example embodiment of the present disclosure.

FIG. 8 is a diagram illustrating a first example of an aspect in which an estimation unit 14 displays an estimation result on a display screen 200 according to the first example embodiment of the present disclosure.

FIG. 9 is a diagram illustrating a second example of an aspect in which an estimation unit 14 displays an estimation result on a display screen 200 according to the first example embodiment of the present disclosure.

FIG. 10 is a flowchart illustrating an operation of estimating a product to be recommended to a subject customer by the product recommendation system 10 according to the first example embodiment of the present disclosure.

EXAMPLE EMBODIMENT

A system according to an example embodiment to be described later uses a trained model (also referred to as an estimation model) generated by machine learning (e.g., deep learning) when estimating a target event from certain input information. For example, the system uses a graph including nodes and edges (also referred to branches) representing the input information. The graph changes in structure over time. The system has been conceived by applying an algorithm capable of analyzing features in such a graph. As such an algorithm, for example, the following algorithm has been known.

(1) TGFN (Temporal Graph Factorization Network)

This is an algorithm for extracting, from a graph that changes in structure over time, a static feature that is unchanged regardless of the time and a dynamic feature unique to each time, and analyzing the extracted features. This algorithm is disclosed in NPL 1, and thus, the detailed description thereof will be omitted in an example embodiment to be described later.

(2) STAR (Spatio-Temporal Attentive RNN)

This is an algorithm for identifying and analyzing, from a graph that changes in structure over time, for example, a node that is important when a certain event is estimated (that is, a node that greatly influences estimation) on each of a temporal axis and a spatial axis, among nodes included in the graph. This algorithm is disclosed in NPL 2, and thus, the detailed description thereof will be omitted in an example embodiment to be described later.

(3) Netwalk

This is an algorithm for extracting, a graph that changes in structure over time, a feature amount of a node included in the graph. This algorithm is disclosed in NPL 3, and thus, the detailed description thereof will be omitted in an example embodiment to be described later.

The disclosure based on an example embodiment to be described later enables an improvement in precision with which a target event is estimated by applying the above-described algorithm at the time of generating a trained model and at the time of estimating the target event from certain input information using the trained model.

Example embodiments of the present disclosure will be described in detail with reference to the drawings.

First Example Embodiment

Figure 1:
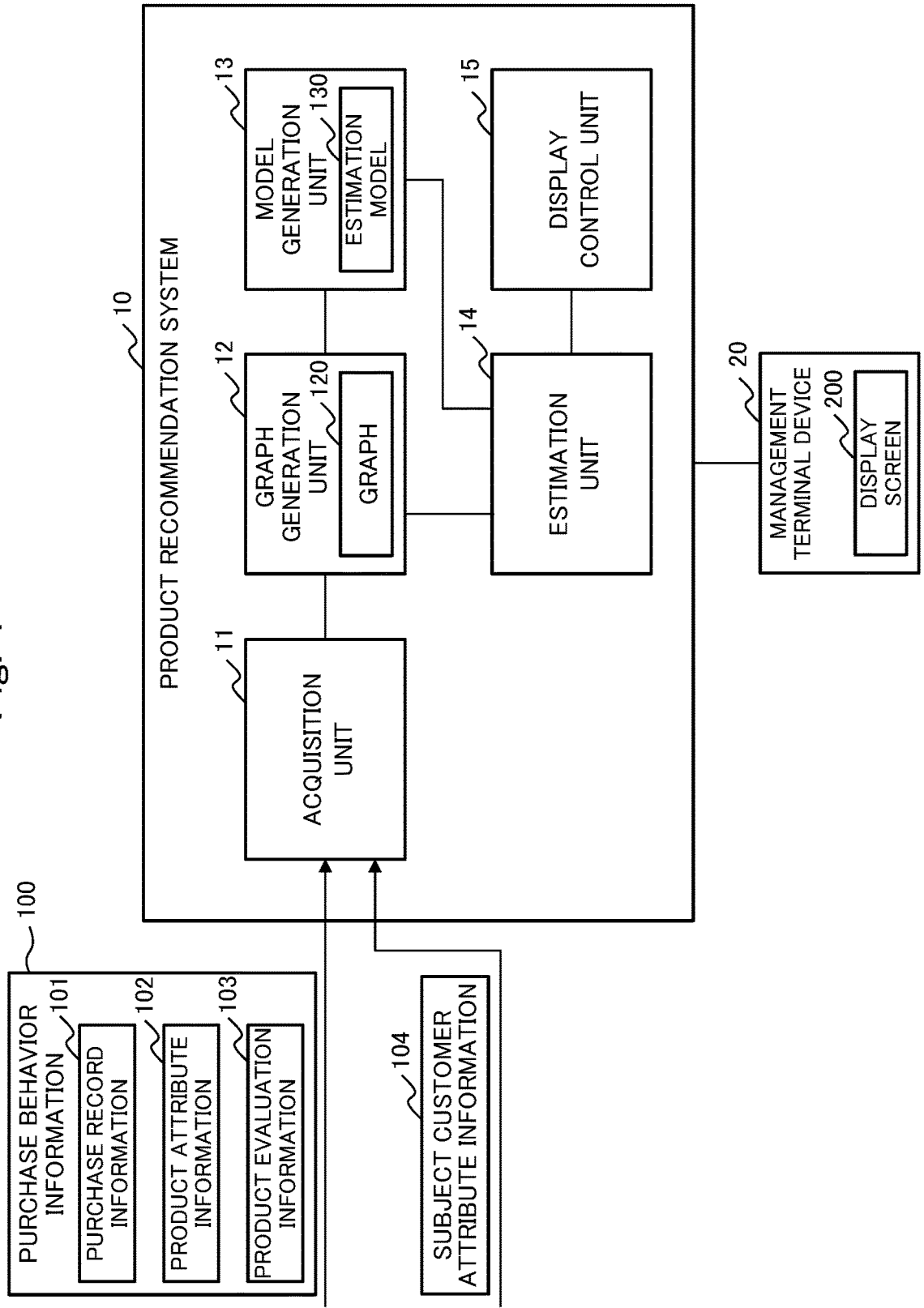
FIG. 1 is a block diagram illustrating a configuration of a product recommendation system 10 according to a first example embodiment of the present disclosure.

FIG. 1 is a block diagram illustrating a configuration of a product recommendation system 10 according to a first example embodiment of the present disclosure. The product recommendation system 10 according to the present example embodiment is a system that estimates a product to be recommended to a subject customer based on information regarding product purchase activities of the subject customer, attributes of the subject customer and the product, and the like. The product recommendation system 10 generates a trained model (also referred to as an estimation model) using information regarding a purchase activity of the subject customer in which a past product purchase record is added as a label, attributes of the subject customer, and the like. Then, the product recommendation system 10 estimates a product to be recommended to the subject customer using the trained model. The product recommendation system 10 includes at least one information processing device.

A management terminal device 20 (also referred to as a display device) is communicably connected to the product recommendation system 10. For example, the management terminal device 20 is a personal computer or another information processing device used when a user using the product recommendation system 10 inputs information to the product recommendation system 10 or checks information output from the product recommendation system 10. The management terminal device 20 includes a display screen 200 that displays information output from the product recommendation system 10.

The product recommendation system 10 includes an acquisition unit 11, a graph generation unit 12, a model generation unit 13, an estimation unit 14, and a display control unit 15. The graph generation unit 12, the model generation unit 13, the estimation unit 14, and the display control unit 15 are examples of a graph generation means, a model generation means, an estimation means, and a display control means, respectively.

Next, each of operations of generating or updating an estimation model 130 for estimating a product to be recommended to the subject customer and estimating a product to be recommended to the subject customer using the generated or updated estimation model 130 by the product recommendation system 10 according to the present example embodiment will be described.

<Operation of Generating (Updating or Re-Training) Estimation Model 130>

First, an operation of generating or updating (also referred to as re-training) an estimation model 130 for estimating a product to be recommended to the subject customer by the product recommendation system 10 according to the present example embodiment will be described.

The acquisition unit 11 acquires purchase behavior information 100 pertaining to the subject customer during a certain period (also referred to as a first period) and subject customer attribute information 104 from a computer device (not illustrated) or a database via a network. For example, the acquisition unit 11 may periodically acquire the purchase behavior information 100 and the subject customer attribute information 104. Alternatively, the acquisition unit 11 may acquire the purchase behavior information 100 and the subject customer attribute information 104 in response to an instruction input by the user via the management terminal device 20. For example, the acquisition unit 11 includes a communication circuit connected to one or a plurality of computer devices or databases that transmit the purchase behavior information 100 and the subject customer attribute information 104, and a storage device that stores the information acquired by the communication circuit. The storage device may be a hard disk 904 or a RAM 903 of an information processing system 900 illustrated in FIG. 12 to be described later.

The purchase behavior information 100 is information indicating a time-series change (temporal change or temporal course) in product purchase activity of the subject customer. The purchase behavior information 100 includes purchase record information 101, product attribute information 102, and product evaluation information 103.

FIG. 2 is a diagram illustrating details of data of the purchase record information 101 according to the present example embodiment. The purchase record information 101 indicates a purchase date, a unit price, a quantity, and a purchase amount with respect to a purchased product (product X, product Y, product Z, or the like) for each subject customer (customer A, customer B, customer C, or the like). The customer A, the customer B, the customer C, and the like are, for example, business operators to whom products are to be sold by a business operator using the product recommendation system 10. The product X, the product Y, the product Z, and the like are products that can be provided by a business operator using the product recommendation system 10 or products provided by other business operators. The purchase record information 101 may include information different from the purchase date, unit price, quantity, and purchase amount, for example, a purchase frequency within a predetermined period and a behavior before purchase, and the like. The behavior before purchase includes all behaviors taken before a product is purchased, such as browsing of a homepage, when an inquiry is put to a person in charge and how many times inquiries are put to the person in charge, a date of business discussion and the number of times of business discussion, and information regarding non-purchased products searched for by the time a product was purchased. Furthermore, since the unit price is also included in the product attribute information 102 to be described later, the unit price may not be included in the purchase record information 101. In addition, the purchase record information 101 may include behavior information with respect to a non-purchased product for the subject customer. In this case, the purchase record information 101 includes, for example, a series of behaviors of the subject customer related to purchased product A and a series of behaviors of the subject customer related to product B that had been searched for or inquired before the purchased product A was purchased but has not been purchased as a result (non-purchased product B).

The purchase record information 101 is information that includes a product purchase history of a certain subject customer as described above, and changes in time series with a purchase record added when a product is purchased by the subject customer.

FIG. 3 is a diagram illustrating details of the product attribute information 102 according to the present example embodiment. The product attribute information 102 indicates a unit price of each product and the type (category) of the product as attributes of the product. The product attribute information 102 may include information regarding attributes of the product different from the unit price and the kind of the product (e.g., attributes of a seller of the product, attributes of a manufacturer of the product, and a manufacturing place). Since the unit price may be changed based on sales strategies, the product attribute information 102 also includes information that changes in time series. How the unit price of the product changes in time series (price increase or price decrease) is one of indexes for determining whether to recommend the product. For example, a product having a tendency toward price decrease may be recommended to a customer who considers a low price important.

Figure 4:
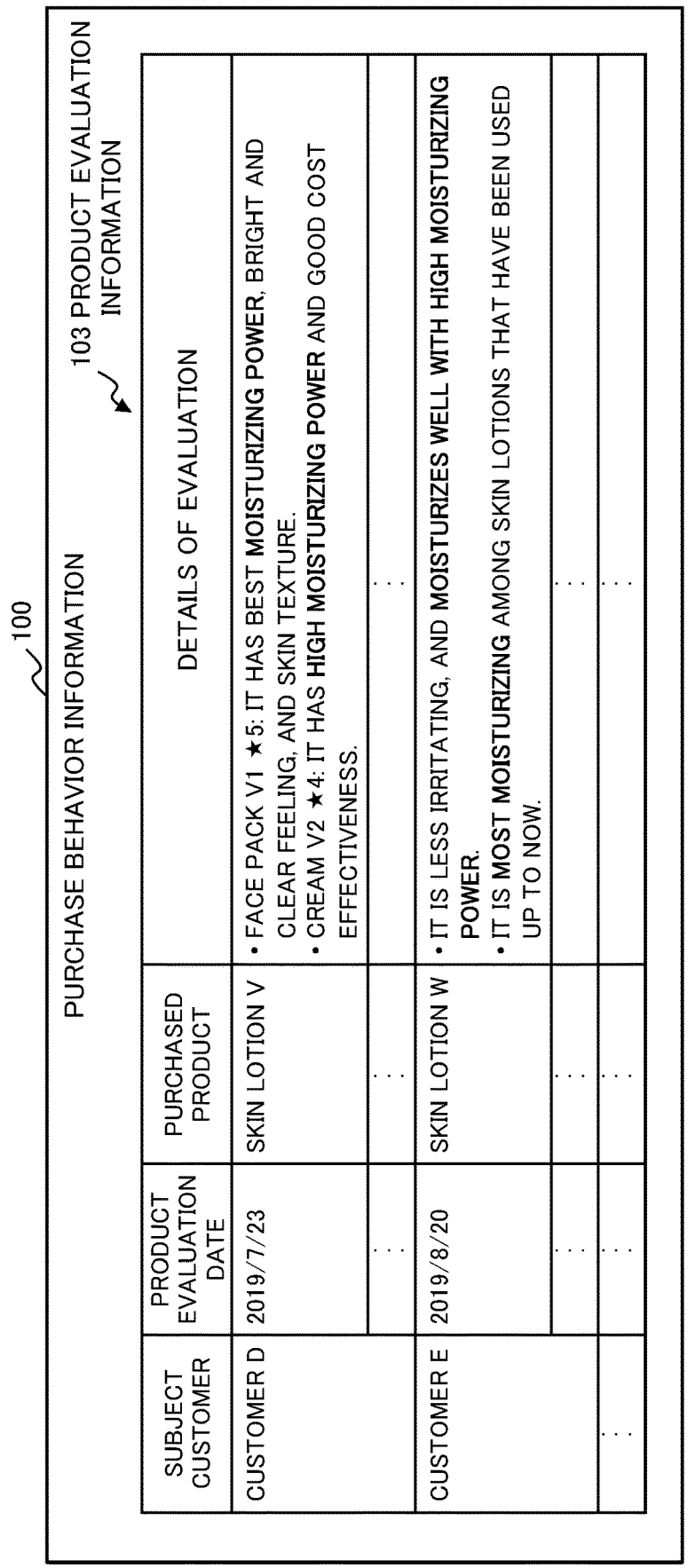
FIG. 4 is a diagram illustrating details of product evaluation information 103 according to the first example embodiment of the present disclosure.

FIG. 4 is a diagram illustrating details of the product evaluation information 103 according to the present example embodiment. For example, the product evaluation information 103 indicates details of evaluation made by a subject customer for a purchased product, such as a content of posting on an electronic commerce (EC) site or the like and a product evaluation date (a date of posting on the EC site).

The product evaluation information 103 can be acquired, for example, by regularly visiting the EC site.

In the product evaluation information 103 illustrated in FIG. 4, a customer D and a customer E are individual customers (general consumers). The customer D evaluates purchased skin lotion V as having a high moisturizing power, and the customer E evaluates purchased skin lotion W as having a high moisturizing power. It is assumed that the product recommendation system 10 according to the present example embodiment is capable of analyzing a content of a sentence posted on the EC site, for example, by using a known sentence analysis technology or the like, and converting the content into a predetermined data format enabling information processing.

The product evaluation information 103 includes information that indicates a product evaluation history of a certain subject customer (hereinafter, also simply referred to as a purchaser) as described above, and changes in time series by being updated when a detail of an evaluation of a product is posted on the EC site or the like by the subject customer. How the evaluation of the product changes in time series (whether the evaluation becomes better or worse) is one of indices for determining whether to recommend the product. For example, a product having a tendency toward better evaluation may be recommended among a plurality of products that fall under the same category.

FIG. 5 is a diagram illustrating details of the subject customer attribute information 104 according to the present example embodiment. The subject customer attribute information 104 indicates a capital, a business field, sales, and a net profit for each subject customer that is a business operator. The subject customer attribute information 104 may include information regarding attributes of the subject customer different from the capital, sales, and net profit (e.g., business details, a business-conducted country, a business scale such as the number of stores or the number of employees for the customer). Since the sales and the net profit in the subject customer attribute information 104 change every predetermined period such as every year or every quarter, the subject customer attribute information 104 includes information that changes in time series. How the attribute of the subject customer changes in time series is one of indexes for determining whether to recommend a certain product to the subject customer. For example, a product related to information technology (IT) infrastructure may be recommended to a subject customer whose performance (sales or net profit) is increasing.

When the subject customer is a general consumer such as the customer D or the customer E in the product evaluation information 103 illustrated in FIG. 4, the subject customer attribute information 104 may include, for example, information regarding an age, a sex, an occupation, and the like.

The acquisition unit 11 stores the purchase record information 101, the product attribute information 102, the product evaluation information 103, and the subject customer attribute information 104 acquired as described above in a storage device (e.g., a memory or a hard disk) although not illustrated.

The graph generation unit 12 illustrated in FIG. 1 generates a graph 120 indicating the purchase record information 101, the product attribute information 102, the product evaluation information 103, and the subject customer attribute information 104 acquired by the acquisition unit 11 during a predetermined period. Specifically, the graph generation unit 12 reads the purchase record information 101, the product attribute information 102, the product evaluation information 103, and the subject customer attribute information 104 from the storage device, and generates a graph 120 based on a graph generation algorithm. In this case, the graph 120 indicates time-series change (course of purchase and attribute) in product purchase activities of the subject customer and attributes of the subject customer during the predetermined period.

Figure 6:
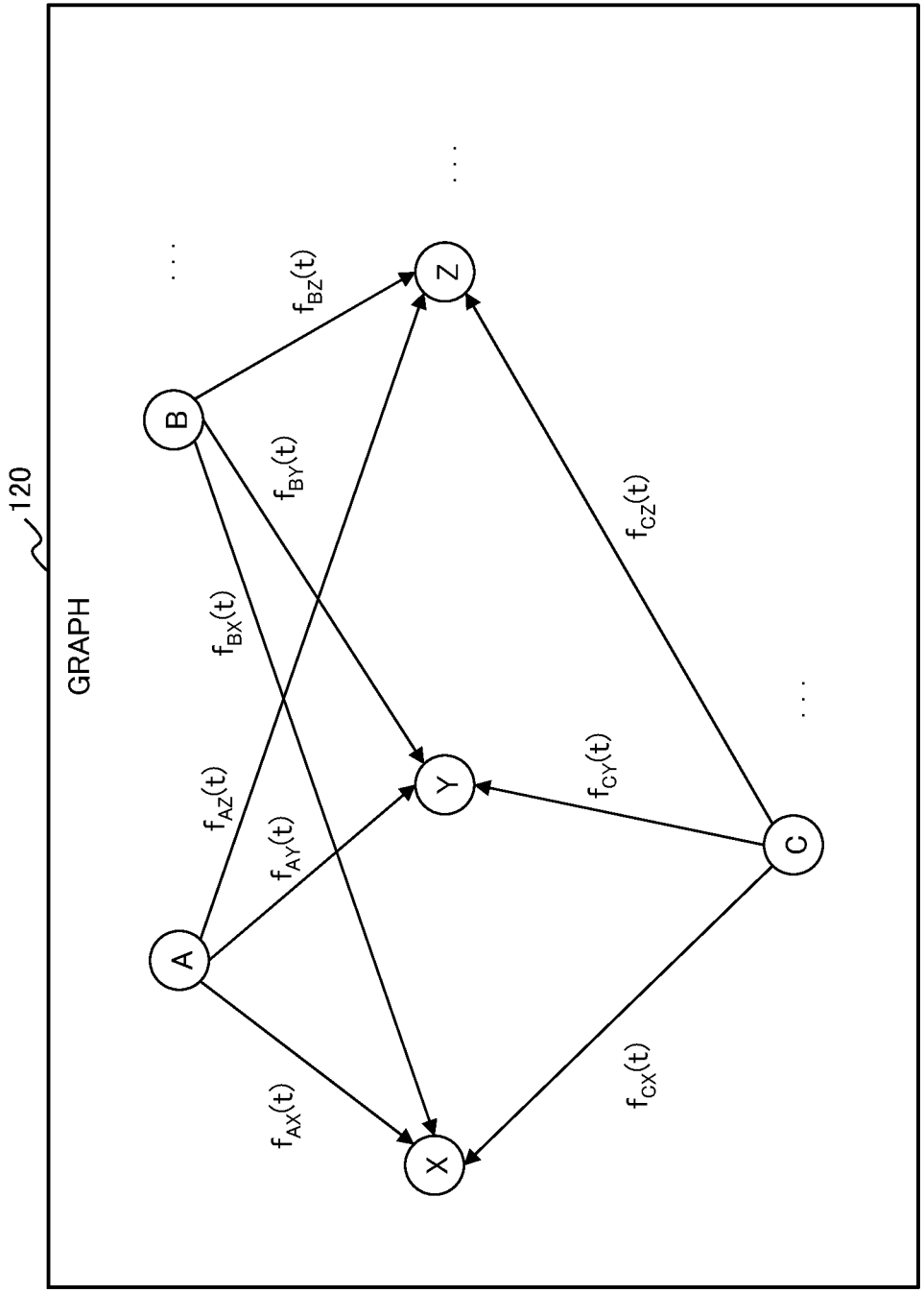
FIG. 6 is a diagram illustrating a configuration of a graph 120 according to the first example embodiment of the present disclosure.

FIG. 6 is a diagram illustrating a configuration of the graph 120 according to the present example embodiment. As illustrated in FIG. 6, the graph 120 includes nodes representing a customer A, a customer B, a customer C, and the like as subject customers, and a product X, a product Y, a product Z, and the like, and edges indicating relationships between the nodes. That is, the graph 120 includes two types of nodes: nodes representing products and nodes representing customers. The graph 120 includes edges each representing information indicating whether each subject customer has purchased each product and information indicating an evaluation of the product made by each subject customer. That is, graph 120 includes a first node representing a subject customer, a second node representing a product, and an edge representing a product purchase activity (whether the product is purchased, etc.). The edge connects the nodes to each other. In the example of FIG. 6, the node is expressed as a circle surrounding the name of each customer or each product, and the edge is expressed as an arrow, but the node and the edge are not limited thereto. For example, the edge may be expressed as a line that does not indicate a direction rather than the arrow. In addition, although there is no edge connecting customers to each other in the graph 120 illustrated in FIG. 6, a similarity in attribute or purchase behavior between customers may be calculated, and the customers may be connected to each other by an edge when the similarity is equal to or more than a predetermined threshold.

Each of node in the graph 120 includes attribute information pertaining to each subject customer or each product. More specifically, a node representing a subject customer in the graph 120 includes subject customer attribute information 104. Also, a node representing a product in the graph 120 includes product attribute information 102. Therefore, each node is represented by a multidimensional function in which information included in the above-described information regarding each attribute (e.g., sales, a net profit, or a unit price) is included as an element with time t as a variable. The multi-dimensional function representing the node is stored in association with the information indicated by the node in a storage device (e.g., the hard disk 904 or the RAM 903) although not illustrated.

More specifically, each edge in the graph 120 is associated with the purchase record information 101 and the product evaluation information 103. For example, an edge connecting a node representing the subject customer A and a node representing the product X to each other may include a purchase record of the product X for the subject customer A indicated by the purchase record information 101, and the purchase record may be represented by, for example, a function $f_{AX}(t)$ illustrated in FIG. 6. In addition, details of an evaluation of the product X by the subject customer A indicated by the product evaluation information 103 is also represented by the function $f_{AX}(t)$ illustrated in FIG. 6. A function pertaining to each edge such as the function $f_{AX}(t)$ is a multi-dimensional function including information (e.g., a purchase amount) included in the purchase record information 101 and information (e.g., evaluation details) included in the product evaluation information 103 as elements with time t as a variable. The multi-dimensional function representing the edge is stored in association with the edge in a storage device (e.g., the hard disk 904 or the RAM 903) although not illustrated.

Furthermore, the graph generation unit 12 adds a purchase record of a product after the predetermined period for the subject customer A, B, C, or the like to the graph 120 generated for the predetermined period as a label of teacher data used when the model generation unit 13 to be described later performs machine learning.

For example, in a case where the predetermined period is year 2017, the graph generation unit 12 adds a product purchase record of a subject customer in 2018 as a label to the graph 120 generated with respect to the information pertaining to the period of year 2017. The graph generation unit 12 stores, in the storage device, a configuration of the graph 120 that is a graph generated for the predetermined period with the purchase record being added as a label. The graph generation unit 12 outputs the graph 120 for the year 2017 to which the label is added to the model generation unit 13 as teacher data. In this case, the graph generation unit 12 adds a product purchase record of the subject customer in 2019 to the graph 120 generated for the year 2018 as a label. The graph generation unit 12 outputs the graph 120 for the year 2018 to which the label is added to the model generation unit 13 as teacher data.

As described above, while changing a period (also referred to as a first period) for which the graph 120 is to be generated, the graph generation unit 12 sequentially adds product purchase records of the subject customer after the respective periods to the graph 120 as labels. Then, the graph generation unit 12 outputs the graph 120 to which the labels are added to the model generation unit 13 as teacher data.

The graph generation unit 12 may generate (plot) a function graph rather than the graph structure data described above. In this case, the graph generation unit 12 can generate, for example, a graph (function) in which a horizontal axis represents a time (date) and a vertical axis represents a purchase record.

The model generation unit 13 generates an estimation model 130 (trained model) to be used when the estimation unit 14 to be described later estimates a product to be recommended to a subject customer, using the graph 120 input from the graph generation unit 12 with the labels being added thereto as teacher data. The model generation unit 13 performs machine learning for generating an estimation model 130 (trained model) using the above-described teacher data through a processor.

Specifically, the model generation unit 13 extracts, from the graph 120 input thereto, features of time-series changes in product purchase activity of the subject customer and attributes of the subject customer and the product, using a predetermined algorithm. The model generation unit 13 can use, for example, TGFN, STAR, Netwalk, or the like described above as the predetermined algorithm.

For example, by using TGFN, the model generation unit 13 extracts, from the graph 120, dynamic features that change with time together with static features regarding the product purchase activity of the subject customer and the attributes of the subject customer and the product. Alternatively, for example, by using STAR, the model generation unit 13 extracts a node that is important at the time of estimating a product to be recommended to the subject customer (that is, a node that greatly influences estimation) on each of a temporal axis (a viewpoint over a certain period of time) and a spatial axis (a viewpoint focusing on an individual time). Alternatively, for example, by using Netwalk, the model generation unit 13 extracts a feature amount of a node from the graph 120. In a case where Netwalk is used, the model generation unit 13 may combine Netwalk with a known prediction algorithm, e.g., gradient boosting.

Next, in a process of performing machine learning using the above-described teacher data, the model generation unit 13 determines an explanatory variable related to a product to be recommended to the subject customer from the result of extracting the features from the graph 120 as described above. A specific example of the explanatory variable will be described later. Specifically, the result of extracting the features from the graph 120 includes static features and dynamic features regarding the purchase activity and the attributes of the subject customer and the product, or feature amounts of nodes. Then, the model generation unit 13 generates an estimation model 130 including a criterion for estimating a product to be recommended to the subject customer based on a value of the explanatory variable. The model generation unit 13 determines the criterion by performing machine learning with respect to a relationship between the value of the explanatory variable and the value of the label in the teacher data.

For example, the model generation unit 13 determines an explanatory variable related to a time-series change in product purchase activity of the subject customer indicated by the purchase behavior information 100. The explanatory variable represents, for example, a product purchase record of the subject customer or details of an evaluation of a product by the subject customer, but is not limited thereto. The model generation unit 13 determines an explanatory variable related to a time-series change in attribute of the subject customer indicated by the subject customer attribute information 104. The explanatory variable represents, for example, a time-series change (temporal course) in sales or net profit of the subject customer, but is not limited thereto.

When determining the explanatory variable as described above, the model generation unit 13 also determines a degree of importance (a degree of contribution to the estimation result) for each of a plurality of explanatory variables in estimating a product to be recommended to the subject customer. The model generation unit 13 may weight a value of each explanatory variable to the above-described criterion for estimating a product to be recommended to the subject customer according to the degree of importance of the explanatory variable. At this time, the model generation unit 13 may determine a different degree of importance with respect to the same explanatory variable for each subject customer because of differences between subject customers in features regarding the purchase behavior information 100 and the subject customer attribute information 104. That is, for example, with respect to a certain explanatory variable, the model generation unit 13 may set a degree of importance thereof in estimating a product to be recommended to the customer A to be high, and may set a degree of importance thereof in estimating a product to be recommended to the customer B to be low.

The model generation unit 13 stores the estimation model 130 generated or updated as described above in a nonvolatile storage device although not illustrated. The model generation unit 13 can gradually improve estimation precision by updating (also referred to as re-training) the estimation model 130, for example, every predetermined time interval.

Next, an operation (process) of generating an estimation model 130 (performing machine learning) by the product recommendation system 10 according to the present example embodiment will be described in detail with reference to a flowchart of FIG. 7.

The acquisition unit 11 acquires, from the outside, purchase behavior information 100 and subject customer attribute information 104 for a certain past period to be used as teacher data (step S101). The graph generation unit 12 generates (updates) a graph 120 using the purchase behavior information 100 and the subject customer attribute information 104 acquired by the acquisition unit 11, and adds a product purchase record of the subject customer as a label to the graph 120 (step S102).

The model generation unit 13 extracts a feature of a time-series change in product purchase record of the subject customer and a feature of an attribute of the subject customer from the graph 120 generated by the graph generation unit 12 using a predetermined algorithm (step S103). Based on the extraction result, the model generation unit 13 determines an explanatory variable of a product to be recommended to the subject customer (step S104).

The model generation unit 13 determines a degree of importance for each explanatory variable in estimating a product to be recommended to the subject customer using a predetermined algorithm, and generates (updates) an estimation model 130 including the explanatory variable (step S105). Then, the entire process ends.

<Operation of Estimating Product to be Recommended to Subject Customer>

Next, an operation of estimating a product to be recommended to a subject customer using the generated or updated estimation model 130 by the product recommendation system 10 according to the present example embodiment will be described.

The acquisition unit 11 acquires the purchase behavior information 100 and the subject customer attribute information 104 pertaining to the subject customer from an external device (not illustrated), similarly to what is done when the product recommendation system 10 generates the estimation model 130. However, the acquisition unit 11 acquires such information as data for estimating a product to be recommended to the subject customer rather than the above-described teacher data. For example, as described above, it is assumed that the estimation model 130 has been generated based on the purchase behavior information 100 and the subject customer attribute information 104 for a certain past period (also referred to as a first period). In this case, the acquisition unit 11 acquires purchase behavior information 100 and subject customer attribute information 104 for a period for estimation (also referred to as a second period) that is later than the certain past period, for example, in response to an instruction input by a user via the management terminal device 20. Aspects of the purchase behavior information 100 and the subject customer attribute information 104 for the period for estimation are similar to those of the purchase behavior information 100 and the subject customer attribute information 104 used when the estimation model 130 illustrated in FIGS. 2 to 5 is generated.

The graph generation unit 12 generates a graph 120 representing the purchase behavior information 100 and the subject customer attribute information 104 for the period for estimation. The graph 120 has a configuration as described above with reference to FIG. 6.

For example, it is assumed that the purchase behavior information 100 and the subject customer attribute information 104 for a period up to year 2018 are reflected in the estimation model 130. In addition, it is assumed, for example, that purchase behavior information 100 and subject customer attribute information 104 for year 2019 are added as latest information to the product recommendation system 10 by the user. In this case, the graph generation unit 12 generates the graph 120 representing the purchase behavior information 100 and the subject customer attribute information 104 for the year 2019 given as the latest information as a graph for estimating a product to be recommended to the subject customer.

The estimation unit 14 illustrated in FIG. 1 estimates a product to be recommended to the subject customer based on the graph 120 for estimating a product to be recommended to the subject customer and the estimation model 130.

Similarly to what is done when the model generation unit 13 generates or updates the estimation model 130, the estimation unit 14 extracts, from the graph 120 input from the graph generation unit 12, features of time-series changes in product purchase activity of the subject customer and attributes of the subject customer and the product. At this time, the estimation unit 14 may use a predetermined algorithm, e.g., TGFN, STAR, or Netwalk, described above.

The estimation unit 14 obtains a value of an explanatory variable identified by the estimation model 130 in the graph 120 based on the features extracted from the graph 120. The estimation unit 14 estimates a product to be recommended to the subject customer by comparing the obtained value of the explanatory variable with the criterion for estimating a product to be recommended to the subject customer included in the estimation model 130.

The estimation unit 14 outputs, to the display control unit 15, information indicating a result of estimating a product to be recommended to the subject customer and a reason for the estimation. The information indicating the reason for the estimation includes, for example, a value of an explanatory variable in the graph 120 for estimating a product to be recommended to the subject customer, a degree of importance of the explanatory variable.

The display control unit 15 displays, on the display screen 200 of the management terminal device 20, the information indicating the result of estimating a product to be recommended to the subject customer and the reason for the estimation, which are input from the estimation unit 14. That is, the display control unit 15 controls the management terminal device 20 to display the result of the estimation made by the estimation unit 14 and the reason for the estimation on the display screen 200 of the management terminal device 20.

FIG. 8 is a diagram illustrating a first example of an aspect in which the display control unit 15 displays information indicating a result of estimating a product to be recommended to the subject customer and a reason for the recommendation (a reason for the estimation) on the display screen 200 according to the present example embodiment.

The display screen 200 illustrated in FIG. 8 displays a product X as a product recommended to the customer A (also referred to as a recommended product). In addition, the display screen 200 displays reasons why the product X is recommended to the customer A in descending order in terms of a degree of importance (a degree of contribution) of an explanatory variable as follows.

1. The customer C of another company in the same business field has a record of purchasing the product X.

(In this case, the reason for the recommendation is "attribute".)

2. The customer A has recently purchased a product Y, and the customer F of another company in the same business field has purchased the product X after purchasing the product Y.

(In this case, the reason for the recommendation is that "customers whose attributes are similar take similar purchase behaviors". That is, in this case, a relationship between the attribute and the purchase behavior is a reason for the recommendation.)

3. The customer A with a capital of 1,000,000,000 yen has business performance that has continuously improved for 6 months, and a customer with a capital of 1,000,000,000 yen or more tends to purchase the product X at a timing when the customer's business performance has continuously improved for 6 months or more.

(In this case, the reason for the recommendation is that "the customers are similar in attribute and the customers are similar in feature of time-series change in attribute (time-series feature)". That is, in this case, not only an explanatory variable itself but also a feature of a time-series change in the explanatory variable is a reason for the recommendation.)

As expressed in the reason 1 above, the product recommendation system 10 is advantageous in that explaining efficiency can be improved by presenting an explanatory variable to the customer in a visually recognizable manner as a reason for the estimation. Furthermore, the product recommendation system 10 is advantageous in that it is possible to stimulate a customer to purchase a product, thereby promoting the purchase.

In addition, as expressed in the reason 2 above, the product recommendation system 10 can present, to a customer, a relationship between explanatory variables contributing to estimation in a visually recognizable manner as a reason for estimating a product to be recommended to the customer. For example, in the reason 2 for the recommendation, the explanatory variables contributing to the estimation are customer attribute information and purchase record information (purchase behavior information), and the product recommendation system 10 presents a relationship between the customer attribute information and the purchase record information as a reason for the recommendation. However, the reason for recommendation does not need to be a natural language sentence as long as the reason for the recommendation can be visually recognized. By presenting the relationship between the explanatory variables, the product recommendation system 10 can further improve efficiency in explaining the estimation result.

In addition, as expressed in the reason 3 above, the product recommendation system 10 can present, to a customer, a feature of a time-series change in the explanatory variable contributing to estimation in a visually recognizable manner as a reason for estimating a product to be recommended to the customer. For example, in the reason 3 for the recommendation, the product recommendation system 10 presents customer attribute information and a feature of how the customer attribute information changes in time series (time-series feature) as a reasons for the recommendation. By presenting the time-series change in explanatory variable (a timing of change or the like) as described above, the product recommendation system 10 can further improve efficiency in explaining the estimation result.

In the example illustrated in FIG. 8, the product recommendation system 10 uses a product purchase record of a customer of another company in the same business field as an explanatory variable. More specifically, the product recommendation system 10 uses, as explanatory variables, a purchase record indicating a product purchase order and a purchase record indicating a relationship with a business performance of the subject customer.

FIG. 9 is a diagram illustrating a second example of an aspect in which the display control unit 15 displays information indicating a result of estimating a product to be recommended to the subject customer and a reason for the recommendation on the display screen 200 according to the present example embodiment. However, the display on the display screen 200 illustrated in FIG. 9 is in an aspect based on the premise that the product evaluation information 103 includes details illustrated in FIG. 4.

The display screen 200 exemplified in FIG. 9 displays a skin lotion W as a product recommended to the customer D. Then, the display screen 200 specifies that "details of an evaluation of a skin lotion V that is highly evaluated by the customer D are similar to details of an evaluation of a skin lotion W that is evaluated by the customer E" as a reason why the skin lotion W is recommended to the customer D. In this case, the estimation unit 14 estimates that the customer D who considers a moisturizing power important in the details of the evaluation is highly likely to purchase the skin lotion W, which is highly evaluated by another customer E for its moisturizing power. In addition, as illustrated in FIG. 9, the display screen 200 also displays the details of the evaluation of the skin lotion V by the customer D and the details of the evaluation of the skin lotion W by the customer E, which are indicated by the product evaluation information 103 illustrated in FIG. 4.

In the example illustrated in FIG. 9, the product recommendation system 10 uses, as an explanatory variable, similarity between details of an evaluation of a certain product by a subject customer and details of an evaluation of another product by another customer.

Next, an operation (process) of estimating a product to be recommended to a subject customer by the product recommendation system 10 according to the present example embodiment will be described in detail with reference to a flowchart of FIG. 10.

The acquisition unit 11 acquires, from the outside, purchase behavior information 100 and subject customer attribute information 104 to be used for estimation (step S201). The graph generation unit 12 generates (updates) a graph 120 using the acquired purchase behavior information 100 and subject customer attribute information 104 (step S202).

The estimation unit 14 extracts a feature of a time-series change in product purchase record of the subject customer and a feature of an attribute of the subject customer from the graph 120 generated by the graph generation unit 12 using a predetermined algorithm (step S203). The estimation unit 14 estimates a product to be recommended to the subject customer and specifies a reason for the estimation, based on a result of extracting the features from the graph 120 and the estimation model 130 (step S204). The display control unit 15 displays a result of estimating a product to be recommended to the subject customer by the estimation unit 14 and the reason for the estimation on the display screen 200 of the management terminal device 20 (step S205). Then, the entire process ends.

The product recommendation system 10 according to the present example embodiment can improve precision with which a product to be recommended to a customer is estimated. This is because the product recommendation system 10 estimates a product to be recommended to the subject customer based on the estimation model 130 generated by using a result of extracting a feature of a time-series change from information regarding product purchase activities of the subject customer.

Hereinafter, an effect achieved by the product recommendation system 10 according to the present example embodiment will be described in detail.

In order to estimate a product to be recommended to a customer with high precision, it is necessary to estimate a product in consideration of various purchase factors that affect each other in a complicated manner. For example, the purchase factors include a feature of a time-series change in product purchase record of a customer, a feature of a time-series change in attribute of the customer, and a feature of a time-series change in attribute of a product. Therefore, in order to estimate a product to be recommended to a customer with high precision, it is necessary to perform analysis after grasping a feature of a time-series change in the customer's purchase activity with high precision. However, a typical system for estimating a product to be recommended to a customer has a problem that it is not possible to obtain high estimation precision because it is not possible to sufficiently grasp a feature of a time-series change in the customer's purchase activity.

To solve such a problem, the product recommendation system 10 according to the present example embodiment includes an estimation unit 14 using an estimation model 130 to operate as described above, for example, with reference to FIGS. 1 to 10. That is, the estimation model 130 is a trained model expressing a relationship between purchase behavior information 100 and subject customer attribute information 104 pertaining to a subject customer during a first period, and a product purchase record of the subject customer after the first period. Based on purchase behavior information 100 and subject customer attribute information 104 for a second period that is later than the first period and the estimation model 130, the estimation unit 14 estimates a product to be recommended to the subject customer after the second period. However, the purchase behavior information 100 and the subject customer attribute information 104 are information indicating a time-series change in purchase activity.

The product recommendation system 10 according to the present example embodiment generates a graph 120 that includes nodes and edges representing the purchase behavior information 100 and the subject customer attribute information 104, and changes in structure in times series. In addition, the product recommendation system 10 grasps a feature of a time-series change in purchase activity with high precision, by using the above-described algorithm capable of extracting and analyzing a feature of the generated graph 120 such as TGFN, STAR, or Netwalk. As a result, the product recommendation system 10 can improve precision with which a product to be recommended to the customer is estimated.

In addition, in a process of generating the estimation model 130, the product recommendation system 10 according to the present example embodiment determines an explanatory variable in estimating a product to be recommended to the customer, and further determines a degree of importance (a degree of contribution) for each explanatory variable in estimating a product to be recommended to the customer. Then, the product recommendation system 10 weights the explanatory variable according to its degree of importance to estimate a product to be recommended to the customer. As a result, the product recommendation system 10 can perform an estimation in a state where a feature of a purchase activity has been grasped more accurately as compared with that, for example, when an estimation is performed without calculating a degree of importance, thereby increasing precision with which a product to be recommended to the customer is estimated.

In addition, the model generation unit 13 may classify at least one of subject customers or products indicated by the purchase behavior information 100 and the subject customer attribute information 104 into groups (that is, perform clustering), based on similarity in attribute between the at least one of subject customers or the products. In this case, the model generation unit 13 generates an estimation model 130 expressing a relationship between the groups, with each of the groups being a unit (that is, a node in the graph 120). In this case, the estimation unit 14 specifies a group to which the subject customer belongs, for example, based on the similarity in attribute between subject customers, and then estimates a product to be recommended to the subject customer who belongs to the specified group. Alternatively, the estimation unit 14 may specify a group of products to be recommended to a subject customer, and set the products belonging to the specified group as a result of estimating products to be recommended to the subject customer. By performing such clustering, the product recommendation system 10 can perform estimation processing by treating a new subject customer or product that is not included in the estimation model 130 as an element included in any one of the groups.

In addition, in a typical system for estimating an event using a trained model, an estimation process is performed in a black box manner, thereby presenting only a result of the estimation without presenting a reason for the estimation. Therefore, it is difficult for a user to grasp the basis for the result of the estimation output by the system. In contrast, the product recommendation system 10 according to the present example embodiment displays a reason why the product to be recommended to the customer is estimated, based on a value of an explanatory variable, on the display screen 200 of the management terminal device 20, for example, as illustrated in FIG. 8 or 9. As a result, the product recommendation system 10 can improve efficiency in explaining the reason why the product to be recommended to the customer is estimated.

In addition, for example, in a case where the product attribute information 102 represents a time-series change in supplying status of a product, the model generation unit 13 can generate an estimation model 130 using a relationship between a period in a product life cycle and a product purchase record of the subject customer for the product as an explanatory variable. However, the supplying status of the product is an index represented by, for example, sales in the market. In addition, the period in the product life cycle represents, for example, an introduction period, a growth period, a maturation period, or a decay period. For example, a subject customer who has a high tendency to purchase a product in its introduction period in a product life cycle is an early adaptor who uses a new product at an early stage. Then, the estimation unit 14 estimates a product that is in an introduction period as a product to be recommended to a subject customer who is an early adaptor. In this case, the estimation unit 14 displays that the subject customer is an early adaptor on the display screen 200 as a reason for the estimation. As a result, the product recommendation system 10 can present a customer who is highly important in a marketing strategy, such as an early adaptor, to the user.

Second Example Embodiment

Figure 11:
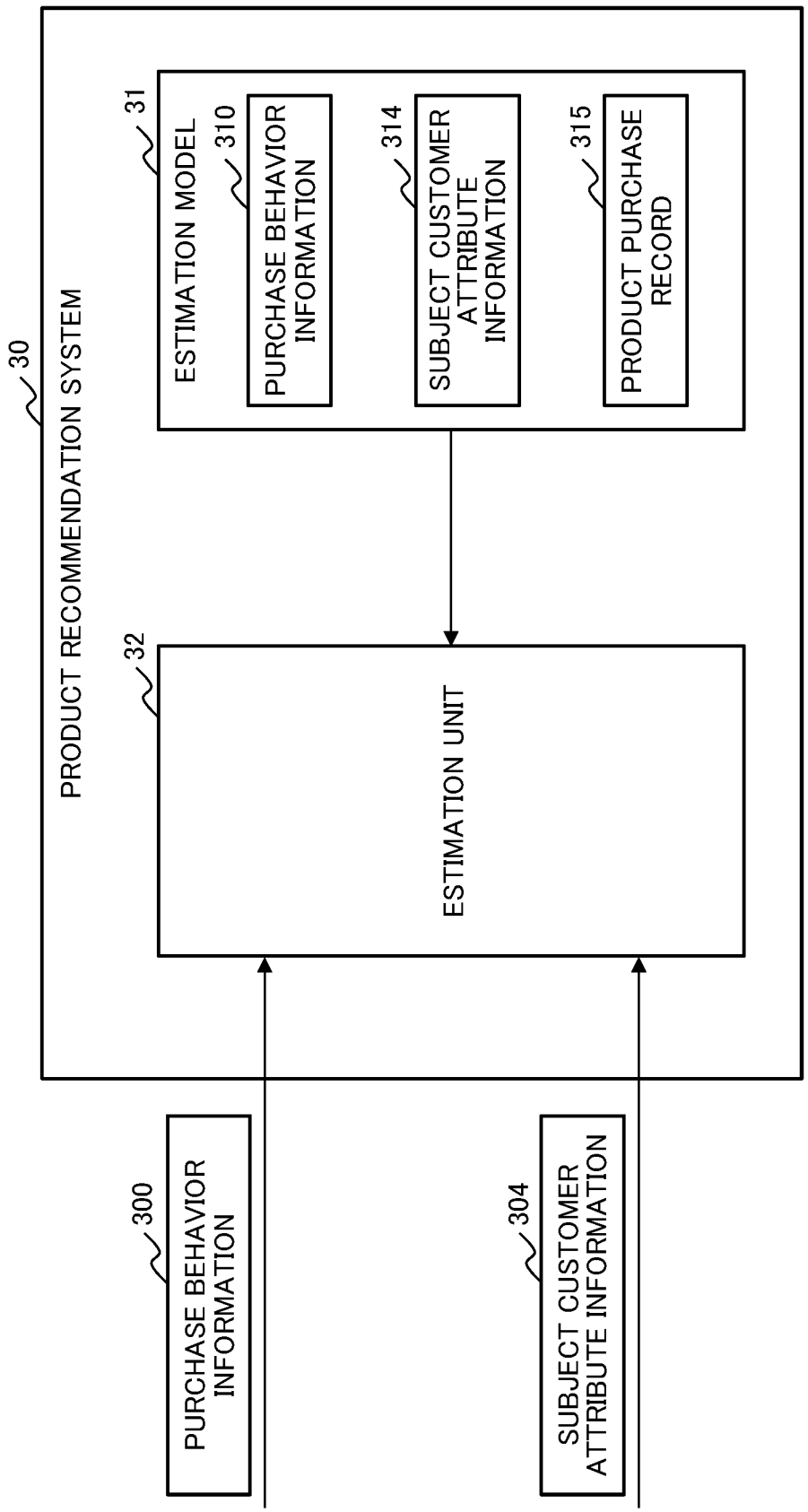
FIG. 11 is a block diagram illustrating a configuration of a product recommendation system 30 according to a second example embodiment of the present disclosure.

FIG. 11 is a block diagram illustrating a configuration of a product recommendation system 30 according to a second example embodiment of the present disclosure. The product recommendation system 30 includes an estimation unit 32 using an estimation model 31. However, the estimation unit 32 is an example of an estimation means.

The estimation model 31 expresses a relationship between purchase behavior information 310 and subject customer attribute information 314 pertaining to a subject customer during a first period (a period for machine learning), and a product purchase record 315 of the subject customer after the first period. For example, similarly to the estimation model 130 according to the first example embodiment, the estimation model 31 is a trained model expressing a result of performing machine learning with respect to a relationship between the purchase behavior information 310 and the subject customer attribute information 314, and the product purchase record 315.

The purchase behavior information 310 represents a time-series change in product purchase activity of the subject customer, and may be, for example, information similar to the purchase behavior information 100 described with reference to FIGS. 2 to 4 regarding the first example embodiment. The subject customer attribute information 314 represents a time-series change in attribute of the subject customer, and may be, for example, information similar to the subject customer attribute information 104 described with reference to FIG. 5 regarding the first example embodiment.

Based on purchase behavior information 300 and subject customer attribute information 304 for a second period that is later than the first period and the estimation model 31, the estimation unit 32 estimates a product to be recommended to the subject customer after the second period.

When estimating a product to be recommended to the subject customer, similarly to the estimation unit 14 according to the first example embodiment, the estimation unit 32 extracts features of time-series changes in product purchase record and attribute of the customer from the purchase behavior information 300 and the subject customer attribute information 304. At this time, the estimation unit 32 can use the predetermined algorithm described in the first example embodiment (TGFN, STAR, Netwalk, or the like).

The product recommendation system 30 according to the present example embodiment can efficiently improve precision with which a product to be recommended to a customer is estimated. This is because the product recommendation system 30 estimates a product to be recommended to the subject customer based on the estimation model 31 generated by using a result of extracting a feature of a time-series change from information regarding product purchase activities of the subject customer.

<Example of Configuration of Hardware>

Each unit in the product recommendation system 10 illustrated in FIG. 1 or the product recommendation system 30 illustrated in FIG. 11 in each of the above-described example embodiments can be achieved by dedicated hardware (HW) (electronic circuit). In addition, in FIGS. 1 and 11, at least the following components can be regarded as functional (processing) units (software modules) of a software program.

Acquisition unit 11
Graph generation unit 12
Model generation unit 13
Estimation units 14 and 32,
Display control unit 15

However, these units illustrated in the drawings are demarcated as components for convenience of description, and various configurations can be considered for implementation. An example of a hardware environment in this case will be described with reference to FIG. 12.

Figure 12:
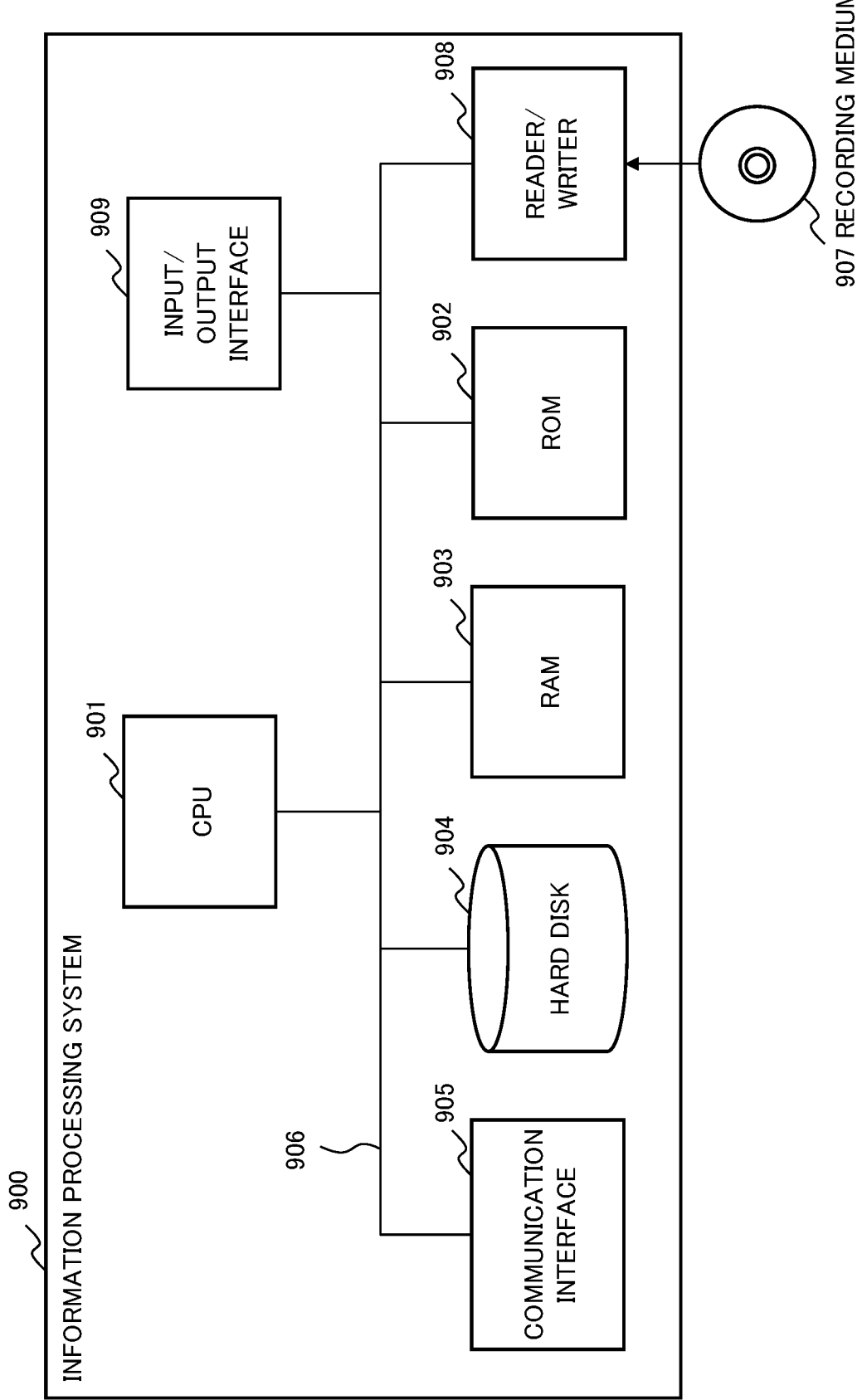
FIG. 12 is a block diagram illustrating a configuration of an information processing system 900 capable of implementing the product recommendation system 10 according to the first example embodiment of the present disclosure or the product recommendation system 30 according to the second example embodiment of the present disclosure.

FIG. 12 is a diagram illustrating an example of a configuration of an information processing system 900 (computer system) capable of implementing the product recommendation system 10 according to the first example embodiment of the present disclosure or the product recommendation system 30 according to the second example embodiment of the present disclosure. That is, FIG. 12 illustrates a hardware environment capable of implementing each function in the above-described example embodiments as a configuration of at least one computer (information processing device) capable of implementing the product recommendation systems 10 and 30 illustrated in FIGS. 1 and 11.

The information processing system 900 illustrated in FIG. 12 includes the following components, but some of the following components may not be included therein.

CPU (Central Processing Unit) 901
ROM (Read Only Memory) 902
RAM (Random Access Memory) 903
Hard disk (storage device) 904
Communication Interface 905 for communication with external device
Bus (communication line) 906
Reader/writer 908 capable of reading and writing data stored in recording medium 907 such as compact disc read only memory (CD-ROM)
Input/output interface 909 such as monitor, speaker, or keyboard.

That is, the information processing system 900 including the above-described components is a general computer in which the components are connected to each other via the bus 906. The information processing system 900 may include a plurality of CPUs 901, or may include a CPU 901 configured by multiple cores. The information processing system 900 may include a graphical processing unit (GPU) (not illustrated) in addition to the CPU 901.

In addition, the present disclosure described using the above-described example embodiments provides a computer program capable of implementing the following functions to the information processing system 900 illustrated in FIG. 12. The functions are functions of the above-described components in the block diagrams (FIGS. 1 and 11) referred to in the description of the example embodiments or the flowcharts (FIGS. 7 and 10). The present disclosure is achieved by reading the computer program to the CPU 901 of the hardware, and interpreting and executing the computer program. The computer program provided in the device may be stored in a readable/writable volatile memory (the RAM 903) or a non-volatile storage device such as the ROM 902 or the hard disk 904.

Furthermore, in the above-described case, a general procedure can be adopted currently as a method of providing the computer program in the hardware. Examples of the procedure include installing the program in the device via any type of recording medium 907 such as a CD-ROM and downloading the program from the outside via a communication line such as the Internet. In such a case, the present disclosure can be considered as being achieved by codes constituting the computer program or the recording medium 907 storing the codes.

The present disclosure has been described above using the above-described example embodiments as preferred embodiments. However, the present disclosure is not limited to the above-described example embodiments. That is, it will be understood by those of ordinary skill in the art that various changes in form and details may be made therein without departing from the spirit and scope of the present disclosure as defined by the claims.

Some or all of the above-described example embodiments may also be described as in the following supplementary notes. However, the present disclosure exemplarily described by the above-described example embodiments is not limited to the following supplementary notes.

(Supplementary Note 1)

A product recommendation system including
an estimation means configured to estimate a product to be recommended to a subject customer after a second period that is later than a first period, based on an estimation model and purchase behavior information and subject customer attribute information during the second period, the estimation model expressing a relationship between the purchase behavior information and the subject customer attribute information pertaining to the subject customer during the first period and a product purchase record of the subject customer after the first period,
in which the purchase behavior information indicates a time-series change in product purchase activity of the subject customer, and
the subject customer attribute information includes information indicating a time-series change in attribute of the subject customer.

(Supplementary Note 2)

The product recommendation system according to supplementary note 1, further including
a display control means configured to control a display device to display recommended product information regarding the recommended product estimated by the estimation means, and a reason why the recommended product is estimated.

(Supplementary Note 3)

The product recommendation system according to supplementary note 2, in which the purchase behavior information includes at least one of a purchase amount and a purchase quantity of a product purchased by the subject customer.

(Supplementary Note 4)

The product recommendation system according to supplementary note 2 or 3, in which the purchase behavior information includes an attribute of a product purchased by the subject customer.

(Supplementary Note 5)

The product recommendation system according to supplementary note 4, in which the purchase behavior information includes details of an evaluation by the subject customer of the product purchased by the subject customer.

(Supplementary Note 6)

The product recommendation system according to supplementary note 4 or 5, in which the purchase behavior information indicates a supplying status of the product purchased by the subject customer.

(Supplementary Note 7)

The product recommendation system according to any one of supplementary notes 2 to 6, in which the subject customer attribute information includes at least one of a capital, a business field, sales, and a net profit pertaining to the subject customer.

(Supplementary Note 8)

The product recommendation system according to any one of supplementary notes 2 to 7, further including
a graph generation means configured to generate a graph expressing the purchase behavior information.

(Supplementary Note 9)

The product recommendation system according to supplementary note 8, in which the graph includes a node representing the subject customer or the product and an edge representing the product purchase activity.

(Supplementary Note 10)

The product recommendation system according to supplementary note 8 or 9, further including
a model generation means configured to generate the estimation model based on the purchase behavior information and the subject customer attribute information during the first period, and the product purchase record of the subject customer after the first period.

(Supplementary Note 11)

The product recommendation system according to supplementary note 10, in which the model generation means generates the estimation model including an explanatory variable of a product to be recommended to the subject customer, the explanatory variable being determined using a predetermined algorithm based on a result of extracting a feature of the time-series change in product purchase activity, from the graph to which the product purchase record of the subject customer indicated by the purchase behavior information is added as a label, using the predetermined algorithm.

(Supplementary Note 12)

The product recommendation system according to supplementary note 10 or 11, in which the model generation means generates the estimation model in which at least one of subject customers or products are classified into groups based on similarity in attribute between at least one of the subject customers or the products indicated by the purchase behavior information and the subject customer attribute information, with each of the groups being a unit, and
the estimation means estimates a product to be recommended to the subject customer after specifying a group to which the subject customer belongs based on the similarity in attribute between subject customers.

(Supplementary Note 13)

The product recommendation system according to supplementary note 11, in which the graph generation means generates the graph including the subject customer attribute information, and
the model generation means determines the explanatory variable related to the attribute of the subject customer from the graph.

(Supplementary Note 14)

The product recommendation system according to supplementary note 11, in which the model generation means determines a degree of importance for each of a plurality of the explanatory variables in estimating a product to be recommended to the subject customer, and
the estimation means estimates a product to be recommended to the subject customer based on the degree of importance.

(Supplementary Note 15)

The product recommendation system according to supplementary note 14, in which the model generation means determines a different degree of importance with respect to the same explanatory variable for each subject customer or each product.

(Supplementary Note 16)

The product recommendation system according to supplementary note 14 or 15, in which the display control means controls the display device to display definitions of the explanatory variables side by side in order of importance, and display the reason for the estimation in such a way as to display values of the explanatory variables.

(Supplementary Note 17)

The product recommendation system according to supplementary note 11, in which the reason for the estimation is either a time-series feature of the explanatory variable or a relationship between explanatory variables contributing to the estimation of the recommended product among the purchase behavior information and the subject customer attribute information during the second period.

(Supplementary Note 18)

A product recommendation device including
an estimation means configured to estimate a product to be recommended to a subject customer after a second period that is later than a first period, based on an estimation model and purchase behavior information and subject customer attribute information during the second period, the estimation model expressing a relationship between the purchase behavior information and the subject customer attribute information pertaining to the subject customer during the first period and a product purchase record of the subject customer after the first period,
in which the purchase behavior information indicates a time-series change in product purchase activity of the subject customer, and
the subject customer attribute information includes information indicating a time-series change in attribute of the subject customer.

(Supplementary Note 19)

A product recommendation method performed by an information processing system, the product recommendation method including
estimating a product to be recommended to a subject customer after a second period that is later than a first period, based on an estimation model and purchase behavior information and subject customer attribute information during the second period, the estimation model expressing a relationship between the purchase behavior information and the subject customer attribute information pertaining to the subject customer during the first period and a product purchase record of the subject customer after the first period,
in which the purchase behavior information indicates a time-series change in product purchase activity of the subject customer, and
the subject customer attribute information includes information indicating a time-series change in attribute of the subject customer.

(Supplementary Note 20)

A recording medium storing a product recommendation program, the program causing a computer to execute processing including
estimating a product to be recommended to a subject customer after a second period that is later than a first period, based on an estimation model and purchase behavior information and subject customer attribute information during the second period, the estimation model expressing a relationship between the purchase behavior information and the subject customer attribute information pertaining to the subject customer during the first period and a product purchase record of the subject customer after the first period,
in which the purchase behavior information indicates a time-series change in product purchase activity of the subject customer, and
the subject customer attribute information includes information indicating a time-series change in attribute of the subject customer.

REFERENCE SIGNS LIST

10 Product recommendation system
100 Purchase behavior information
101 Purchase record information
102 Product attribute information
103 Product evaluation information
104 Subject customer attribute information
11 Acquisition unit
12 Graph generation unit
120 Graph
13 Model generation unit
130 Estimation model
14 Estimation unit
15 Display control unit
20 Management terminal device
200 Display screen
30 Product recommendation system
300 Purchase behavior information
304 Subject customer attribute information
31 Estimation model
310 Purchase behavior information
314 Subject customer attribute information
315 Product purchase record
32 Estimation unit
900 Information processing system
901 CPU
902 ROM
903 RAM
904 Hard disk (storage device)
905 Communication interface
906 Bus
907 Recording medium
908 Reader/writer
909 Input/output interface

What is claimed is:

1. A product recommendation system comprising
a memory storing instructions; and
one or more processors configured to execute the instructions to:
obtain purchase behavior information and subject customer attribute information, wherein the purchase behavior information indicates a time-series change in product purchase activity of a subject customer and product purchase, and the subject customer attribute information includes information indicating a time-series change in attribute of the subject customer;
generate a graph by adding, as a label, a product purchase record of the subject customer indicated by the purchase behavior information during a second period that is later than a first period to a graph which includes a node representing the subject customer, a node representing the product, and an edge representing the product purchase activity between the node representing the subject customer and node representing the product during the first period;
extract, using a predetermined algorithm, a feature of the time-series change in product purchase activity from the generated graph, wherein the predetermined algorithm is TGFN (Temporal Graph Factorization Network), STAR (Spatio-Temporal Attentive RNN), or Netwalk;
generate an estimation model including an explanatory variable of a product to be recommended to the subject customer, the explanatory variable being determined using the predetermined algorithm based on a result of the extracted feature; and
estimate a product to be recommended to a subject customer after the second period, based on the estimation model.

2. The product recommendation system according to claim 1, wherein
the one or more processors are further configured to execute the instructions to:
control a display device to display recommended product information regarding the recommended product estimated, and a reason why the recommended product is estimated.

3. The product recommendation system according to claim 2, wherein the purchase behavior information includes at least one of a purchase amount and a purchase quantity of a product purchased by the subject customer.

4. The product recommendation system according to claim 2, wherein the purchase behavior information includes an attribute of a product purchased by the subject customer.

5. The product recommendation system according to claim 4, wherein the purchase behavior information includes details of an evaluation by the subject customer of the product purchased by the subject customer.

6. The product recommendation system according to claim 4, wherein the purchase behavior information indicates a supplying status of the product purchased by the subject customer.

7. The product recommendation system according to claim 2, wherein the subject customer attribute information includes at least one of a share capital, a business field, sales, and a net profit pertaining to the subject customer.

8. The product recommendation system according to claim 1, wherein
the one or more processors are further configured to execute the instructions to:
generate the estimation model in which at least one of subject customers or products are classified into groups based on similarity in attribute between at least one of the subject customers or the products indicated by the purchase behavior information and the subject customer attribute information, with each of the groups being a unit, and
estimate a product to be recommended to the subject customer after specifying a group to which the subject customer belongs based on the similarity in attribute between subject customers.

9. The product recommendation system according to claim 1, wherein
the one or more processors are further configured to execute the instructions to:
generate the graph including the subject customer attribute information, and
determine the explanatory variable related to the attribute of the subject customer from the graph.

10. The product recommendation system according to claim 1, wherein
the one or more processors are further configured to execute the instructions to:
determine a degree of importance for each of a plurality of the explanatory variables in estimating a product to be recommended to the subject customer, and
estimate a product to be recommended to the subject customer based on the degree of importance.

11. The product recommendation system according to claim 10, wherein
the one or more processors are further configured to:
determine a different degree of importance with respect to the same explanatory variable for each subject customer or each product.

12. The product recommendation system according to claim 2, wherein
the one or more processors are further configured to execute the instructions to:
control the display device to display definitions of the explanatory variables side by side in order of importance, and display the reason for the estimation in such a way as to display values of the explanatory variables.

13. The product recommendation system according to claim 2, wherein the reason for the estimation is either a time-series feature of the explanatory variable or a relationship between explanatory variables contributing to the estimation of the recommended product among the purchase behavior information and the subject customer attribute information during the second period.

14. The product recommendation system according to claim 1, wherein the estimation model is trained by machine learning.

15. A product recommendation method performed by an information processing system, the product recommendation method comprising:
obtaining purchase behavior information and subject customer attribute information, wherein the purchase behavior information indicates a time-series change in product purchase activity of a subject customer and product purchase, and the subject customer attribute information includes information indicating a time-series change in attribute of the subject customer;
generating a graph by adding, as a label, a product purchase record of the subject customer indicated by the purchase behavior information during a second period that is later than a first period to a graph which includes a node representing the subject customer, a node representing the product, and an edge representing the product purchase activity between the node representing the subject customer and node representing the product during the first period;
extracting, using a predetermined algorithm, a feature of the time-series change in product purchase activity from the generated graph, wherein the predetermined algorithm is TGFN (Temporal Graph Factorization Network), STAR (Spatio-Temporal Attentive RNN), or Netwalk;
generating an estimation model including an explanatory variable of a product to be recommended to the subject customer, the explanatory variable being determined using the predetermined algorithm based on a result of the extracted feature; and
estimating a product to be recommended to a subject customer after the second period, based on the estimation model.

16. A non-transitory recording medium storing a product recommendation program, the program causing a computer to execute processing comprising:
obtaining purchase behavior information and subject customer attribute information, wherein the purchase behavior information indicates a time-series change in product purchase activity of a subject customer and product purchase, and the subject customer attribute information includes information indicating a time-series change in attribute of the subject customer;
generating a graph by adding, as a label, a product purchase record of the subject customer indicated by the purchase behavior information during a second period that is later than a first period to a graph which includes a node representing the subject customer, a node representing the product, and an edge representing the product purchase activity between the node representing the subject customer and node representing the product during the first period;

extracting, using a predetermined algorithm, a feature of the time-series change in product purchase activity from the generated graph, wherein the predetermined algorithm is TGFN (Temporal Graph Factorization Network), STAR (Spatio-Temporal Attentive RNN), or Netwalk;

generating an estimation model including an explanatory variable of a product to be recommended to the subject customer, the explanatory variable being determined using the predetermined algorithm based on a result of the extracted feature; and estimating a product to be recommended to a subject customer after the second period, based on the estimation model.

* * * * *